United States Patent
McDowell et al.

(10) Patent No.: US 9,756,894 B2
(45) Date of Patent: Sep. 12, 2017

(54) SINTERED DRAINABLE SHOE

(71) Applicant: Converse Inc., North Andover, MA (US)

(72) Inventors: Sean M. McDowell, Portland, OR (US); Bryan Paul Cioffi, Gloucester, MA (US)

(73) Assignee: Converse Inc., Boston, MA (US)

( * ) Notice: Subject to any disclaimer, the term of this patent is extended or adjusted under 35 U.S.C. 154(b) by 295 days.

(21) Appl. No.: 13/657,125

(22) Filed: Oct. 22, 2012

(65) Prior Publication Data

US 2014/0109441 A1    Apr. 24, 2014

(51) Int. Cl.
A43B 3/00 (2006.01)
A43B 7/08 (2006.01)
(Continued)

(52) U.S. Cl.
CPC .............. *A43B 3/00* (2013.01); *A43B 1/0009* (2013.01); *A43B 5/08* (2013.01); *A43B 7/085* (2013.01);
(Continued)

(58) Field of Classification Search
CPC .... A42C 5/02; A42C 5/00; A42C 1/00; A42C 1/08; A43B 23/0235; A43B 1/04;
(Continued)

(56) References Cited

U.S. PATENT DOCUMENTS 2,118,255 A * 5/1938 Loucks et al. ................. 36/3 A
3,383,782 A   5/1968 McGinnity
(Continued)

FOREIGN PATENT DOCUMENTS

JP       2005205064 A    8/2005
WO  WO 2012028747       3/2012
WO     2014100462 A1    6/2014

OTHER PUBLICATIONS

International Search Report and Written Opinion in PCT/US13/65688, mailed Mar. 10, 2014, 15 pages.
European Search Report dated Sep. 9, 2016 in European Patent Application No. 13849142.8, 11 pages.
International Preliminary Report on Patentability dated May 7, 2015 in PCT Application No. PCT/US2013/065688, 7 pages.

*Primary Examiner* — Alissa L Hoey
*Assistant Examiner* — Catherine M Ferreira
(74) *Attorney, Agent, or Firm* — Shook, Hardy & Bacon L.L.P.

(57) ABSTRACT

Embodiments of the present invention relate to a shoe construction that includes an upper that has an interior surface and a corrugated exterior surface of rapid manufactured material. The upper interior surface and corrugated exterior surface form a lattice-interlace surface. The lattice-interlace surface includes the interior surface that has a plurality of horizontal laths, the corrugated exterior that has a plurality of vertical laths, and a plurality of lattice apertures that extend from an interior of the shoe to an exterior of the shoe. The shoe construction further includes an interior sole portion of sintered material. The interior sole portion forms a tessellated framework. The tessellated framework includes a lattice of hollow cubes; each hollow cube has a top surface opening and a bottom surface opening, the openings extending from an interior of the shoe to an exterior of the shoe.

18 Claims, 5 Drawing Sheets

(51) Int. Cl.
  *A43B 23/02* (2006.01)
  *A43B 1/00* (2006.01)
  *A43B 5/08* (2006.01)
  *B33Y 80/00* (2015.01)

(52) U.S. Cl.
  CPC .............. *A43B 7/087* (2013.01); *A43B 7/088* (2013.01); *A43B 23/0295* (2013.01); *B33Y 80/00* (2014.12)

(58) Field of Classification Search
  CPC ............ A43B 23/0205; A43B 23/0245; A43B 23/0255; A43B 23/026; A43B 23/0265; A43B 23/0215; A43B 23/0275; A43B 23/025; A43B 3/0078; A43B 1/0027; A43B 23/024; A43B 23/027; A43B 11/00; A43B 23/0295; A43B 5/00; A43B 1/0081; A43B 9/02; A43B 13/14; A43B 13/181; A43B 3/0005; A43B 23/02; A43B 23/042; A43B 7/20; A43B 13/223; A43B 23/0225; A43B 23/07
  USPC ........ 2/181; 36/83, 45, 3 A, 3 B, 88; 12/128
  See application file for complete search history.

(56) References Cited

U.S. PATENT DOCUMENTS

| | | |
|---|---|---|
| 6,763,611 B1* | 7/2004 | Fusco ................... A43B 13/125 36/25 R |
| 6,993,858 B2* | 2/2006 | Seamans ......................... 36/3 A |
| 2002/0088140 A1* | 7/2002 | Wang et al. .................... 36/3 B |
| 2003/0106240 A1 | 6/2003 | Wang et al. |
| 2003/0126762 A1* | 7/2003 | Tseng ................... A43B 1/0027 36/48 |
| 2004/0020075 A1 | 2/2004 | Garneau |
| 2004/0074108 A1 | 4/2004 | Shikhashvili |
| 2007/0011907 A1* | 1/2007 | Polegato Moretti ............ 36/3 B |
| 2007/0256328 A1* | 11/2007 | Arizumi ............................ 36/45 |
| 2007/0271815 A1* | 11/2007 | Moretti et al. .................. 36/3 B |
| 2009/0172971 A1* | 7/2009 | Peikert et al. .................... 36/88 |
| 2010/0050480 A1* | 3/2010 | Polegato Moretti ............ 36/3 B |
| 2012/0117822 A1* | 5/2012 | Jarvis ................................ 36/83 |
| 2013/0081307 A1* | 4/2013 | del Biondi et al. .............. 36/83 |
| 2013/0139329 A1* | 6/2013 | Ferniani et al. ............. 12/128 R |

\* cited by examiner

SINTERED DRAINABLE SHOE

BACKGROUND

A drainable shoe, such as a shower shoe, typically relies on openings to allow water to flow into and out of the shoe. Traditionally, the openings that allow water to pass through the drainable shoe are designed using standard manufacturing processes (e.g., molding, pattern cutting, knitting, and sewing). As such, the manufacturing process may impose functional and aesthetic limitations on the drainable shoe construction. Consequently, a drainable shoe may be designed to simultaneously improve the flow of water into and out of the θshoe while also having aesthetically creative structures. Moreover, without the optimal ability to have water pass through the drainable shoe, the shoe may be unsuitable for, amongst other things, showering purposes and also may be uncomfortable to wear.

SUMMARY

Embodiments of the present invention relate to a shoe construction that comprises an upper having an interior surface and a corrugated exterior surface of sintered material. The interior surface and the corrugated exterior surface form a lattice-interlace surface. The lattice-interlace surface includes the interior surface having a plurality of horizontal laths, the corrugated exterior having a plurality of vertical laths, and a plurality of lattice apertures extending from an interior of the shoe to an exterior of the shoe. The shoe construction further comprises an interior sole portion of sintered material. The interior sole portion forms a tessellated framework. The tessellated framework includes a lattice of hollow cubes each having a top surface opening and a bottom surface opening extending from an interior of the shoe to an exterior of the shoe. In embodiments, the lattice of hollow cubes is adjacent to an exterior perforated sole portion that has a plurality of perforations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Embodiments of the present invention relate to a construction of a shoe that comprises an upper having an interior surface and a corrugated exterior surface of sintered material. The upper interior surface and corrugated exterior surface form a lattice-interlace surface. The lattice-interlace surface includes the interior surface having a plurality of horizontal laths, the corrugated exterior having a plurality of vertical laths, and a plurality of lattice apertures extending from an interior of the shoe to an exterior of the shoe. The shoe construction further comprises an interior sole portion of sintered material. The interior sole portion forms a tessellated framework. The tessellated framework includes a lattice of hollow cubes each having a top surface opening and a bottom surface opening extending from an interior of the shoe to an exterior of the shoe. In embodiments, the lattice of hollow cubes is adjacent to an exterior perforated sole portion that has a plurality of perforations.

Accordingly, in one aspect, the present invention provides a shoe construction. The shoe construction has a sole of sintered material with a toe end and an opposite heel end. The sole also has opposite medial and lateral sides extending between the toe end and the heel end. The shoe construction also includes an upper that has an interior surface and a corrugated exterior surface of sintered material. The upper extends upwardly from the sole to an upper top edge. The upper top edge defines a forefoot opening and an ankle opening into an interior of the shoe. Additionally, the upper forms a lattice-interlace surface that includes the interior surface that has a plurality of horizontal laths and the corrugated exterior surface that has a plurality of vertical laths. The plurality of horizontal laths and the plurality of vertical laths form a plurality of apertures. The plurality of apertures extend from the interior of the shoe to an exterior of the shoe.

In another aspect, the present invention provides another shoe construction. The shoe construction includes a sole having a toe end and an opposite heel end. The sole also has opposite medial and lateral sides that extend between the toe end and the heel end. Further, the shoe construction includes an upper attached to the sole. The upper extends upwardly from the sole to an upper top edge. The upper top edge defines a forefoot opening and an ankle opening into an interior of the shoe. The shoe construction also includes an interior sole portion of sintered material that extends from a heel end to a toe end that forms a tessellated framework. The tessellated framework includes a lattice of hollow cubes each having a top surface opening and a bottom surface opening. The openings extend from the interior of the shoe to an exterior of the shoe.

A third aspect of the present invention provides an additional embodiment of a shoe construction. The shoe construction includes a sole. The sole has a toe end and an opposite heel end. Further, the sole has opposite medial and lateral sides extending between the toe end and the heel end. The shoe construction also includes an upper that has an interior surface and a corrugated exterior surface of sintered material. The upper extends upwardly from the sole to an upper top edge. The upper top edge defines a forefoot opening and an ankle opening into an interior of the shoe. The interior surface and the corrugated exterior surface form a lattice-interlace. The shoe construction also includes an interior sole portion of sintered material that extends from a heel end to a toe end that forms a tessellated framework.

Having briefly described an overview of embodiments of the present invention, a more detailed description follows.

Figure 1:
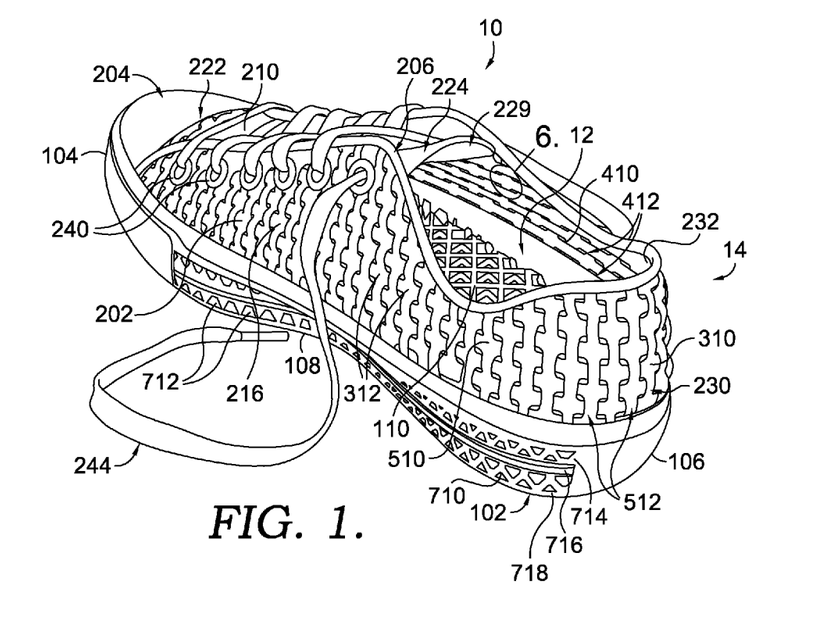
FIG. 1 depicts an exemplary shoe construction, in accordance with embodiments of the present invention.
Figure 2:
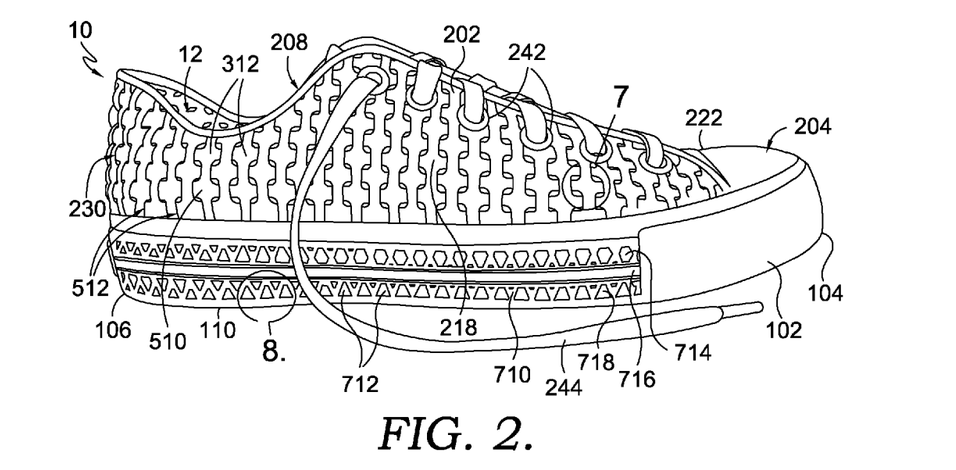
FIG. 2 depicts a lateral view of an exemplary shoe with an upper with a corrugated exterior and an exterior perforated sole portion, in accordance with an embodiment of the present invention.

The construction of shoe 10 of the present invention has the basic construction of a traditional athletic type shoe. However, the construction of the shoe 10 is comprised of an interior surface 410 and a corrugated exterior surface 510 of sintered material forming a lattice-interlace surface 310, as best seen in FIG. 1. The lattice-interlace surface 310 includes the interior surface 410 that has a plurality of horizontal laths 412, the corrugated exterior 510 that has a plurality of vertical laths 512, and a plurality of lattice apertures 312 that extend from an interior 12 of the shoe to an exterior 14 of the shoe 10. The lattice-interlace surface 310 of the shoe is integrally constructed as a single piece using sintered material to form the plurality of apertures 312 that provide an efficient way of having water flow into and out of the shower shoe, as will be discussed in more detail below.

In embodiments, the shoe 10 is a casual-style shoe. However, it should be understood that the novel concept of the invention could be employed on other types of shoes (e.g., high-top, infant, toddler, children, adult, cross-training, running, lifting, sandals, and the like). Because much of the construction of the shoe 10 is the same as that of a conventional shoe, the conventional features of the constructions will be described only generally herein.

The shoe 10 is constructed of sintered material using laser sintering, a rapid manufacturing process. It is contemplated that the shoe 10 may be constructed using other types of rapid manufacturing techniques (e.g., stereolithography, and solid deposition modeling). Rapid manufacturing techniques involve creating a three-dimensional design in a data file, such as a Computer Aided Design (CAD) file, and building the object of the three-dimensional design in an automated layer-by-layer process. Essentially, the fabrication equipment reads the three-dimensional design from the data file and lays successive layers of powder, liquid, or sheet material to build the three-dimensional object. The layers are joined together by the fabrication equipment, for instance a high-powered laser may be used, to form the three-dimensional object of the design, hence laser sintering. Other techniques of rapid manufacturing other than an additive process are also contemplated, such as a subtractive process.

With respect to laser sintering in particular, a laser sintering fabrication equipment reads the CAD file and forms the three-dimensional object of the design (e.g., an upper or sole portion of a shoe) using the high-powered laser to fuse powders or small particles of plastic, metal or ceramic. Laser sintering can produce three-dimensional objects from a relatively wide range of commercially available materials. These materials include, without limitation, polymers such as nylon (neat, glass-filled, or with other fillers), polyurethanes (PU), thermoplastic polyurethanes (TPU), polystyrene, and other polymer-based materials, metals including steel, titanium, alloy mixtures, composites, silica, elastomers, rubbers and latexes. The laser selectively fuses powdered material by scanning cross-sections generated from a CAD file or a scan of the part on the surface of a powder bed. After each cross-section is scanned, the powder bed is lowered by one layer thickness, a new layer of material is applied on top, and the process is repeated until the part is completed. It should be understood that any reference to any part of the shoe made using sintered material includes constructing the shoe through laser sintering or any other rapid manufacturing processes.

Figure 4:
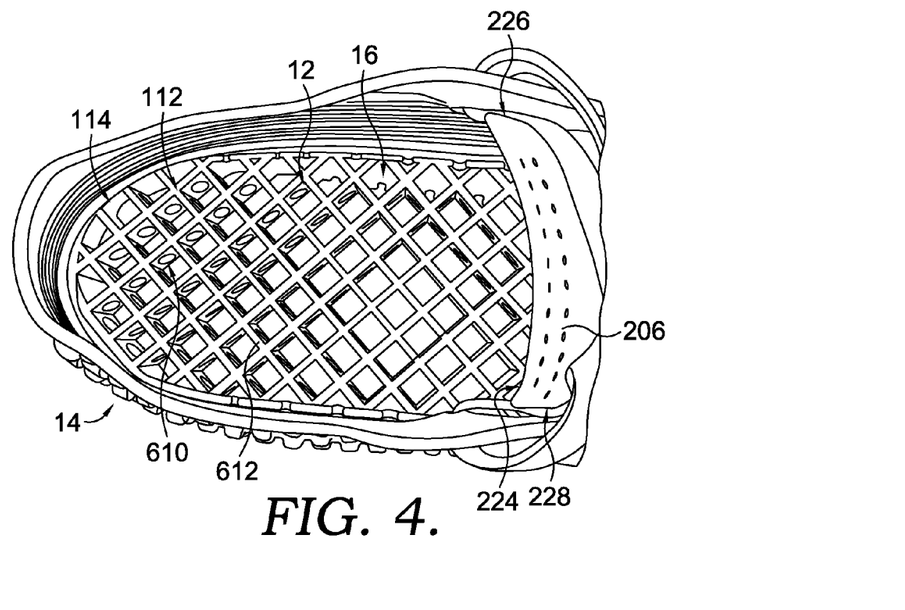
FIG. 4 depicts a top view of a shoe having a lattice of hollow cubes, in accordance with an embodiment of the present invention.

The shoe 10 has a sole 102 that is constructed of sintered material. The sole 102 can be constructed with an outsole, a midsole, and an insert, as is conventional. The sole 102 has a bottom surface that functions as the traction surface of the shoe, and an opposite top surface (e.g., interior sole portion 112) in the interior 12 of the shoe 10. The size of the shoe 10 has a length that extends from a heel end 106 to a toe end 104. As best seen in FIG. 4, the sole 102 has a width that extends between a medial side 108 and a lateral side 110 of the sole 102.

The shoe 10 also is constructed with the upper 202. The upper 202 is secured (e.g., integrally formed in a rapid manufacturing process) to the sole 102 and extends upwardly from the shoe sole, such as the sole top surface. The upper 202 is constructed with a heel portion 230 that extends around the sole 102 at the heel end 106 of the sole 102. The heel portion 230 extends upwardly from the sole 102 to an ankle opening 232. The ankle opening 232 provides access to the shoe interior 12. The upper 202 is constructed of a sintered material, in this example. It is contemplated that the upper may also be constructed in combination with materials including leather, synthetic leather, rubber, textiles, mesh, polymer foams and/or traditional shoe construction materials. The conventional materials and the sintered materials may be stitched, adhesively bonded, or otherwise fused to each other. The upper has an interior surface 410 and a corrugated exterior surface 510. The interior surface 410 is traditionally exposed to the wearer's foot or other garments (e.g., socks). The corrugated exterior surface 510 is traditionally exposed to the outside environment and may define a portion of the exterior 14 of the shoe 10.

From the heel portion 230, the upper 202 has an upper medial side portion 216 and an upper lateral side portion 218 that extend along the respective sole medial side 108 and the sole lateral side 110. The upper medial side portion 216 extends upwardly from the sole medial side 108 to an upper medial side edge 206. The upper lateral side portion 218 extends upwardly from the sole lateral side 110 to an upper lateral side edge 208. As illustrated in the figures, the upper medial side edge 206 and the upper lateral side edge 208 extend rearwardly from opposite sides of the toe end 104 of the sole 102. As best seen in FIG. 1, the length of the upper medial side edge 206 and the upper lateral side edge 208 define a forefoot opening 210 in the upper 202 that opens to the shoe interior 12.

The upper 202 is also constructed with a toe box 204 that extends around and across the sole top surface at the toe end 104 of the sole 102. The toe box 204 is connected to the upper medial side portion 216 and the upper lateral side portion 218 and encloses a portion of the shoe interior 12 adjacent to the toe end 104. The upper medial side edge 206 and the upper lateral side edge 208 extend rearwardly from the toe box 204.

A first plurality of apertures 240 are provided on the upper medial side portion 216 and a second plurality of apertures 242 are provided on the upper lateral side portion 218. The apertures 240 and 242 are lacing openings in an exemplary embodiment. A lacing opening is an opening that is typically occupied by a portion of a fastener, such as lacing (e.g., laces 244) that close the shoe upper over the forefoot opening 210 of the shoe. The apertures 240 and 242 may provide any type of lacing openings on the shoe, for example, D-rings or speed-lacing hooks. However, in an exemplary embodiment, the apertures 240 and 242 are an eyelet or grommet-style aperture. The apertures 240 and 242 are arranged in lines along the upper medial side portion 216 and the upper lateral side portion 218, as is conventional. As illustrated in the figures, the apertures 240 and 242, in an exemplary embodiment, extend substantially the entire length of the upper medial side edge 206 and the upper lateral side edge 208. It is contemplated that the first plurality of apertures and the second plurality of apertures, as described herein, may not be utilized with embodiments of the shoe.

The shoe upper 202 includes a vamp 222 or a throat positioned rearwardly of the toe box 204, and a tongue 224 that extends rearwardly from the vamp 222 through the forefoot opening 210. The tongue 224 extends along the lengths of the upper medial side portion 216 and the upper lateral side portion 218 to a distal end of the tongue 224, a tongue upper edge 229, near an ankle opening 232. As best seen in FIG. 4, the tongue 224 has a width between a medial side edge 226 and a lateral side edge 228 of the tongue 224. The length and width of the tongue position the tongue side edges beneath the upper medial side portion 216 and the upper lateral side portion 218, respectively, and extend the tongue 224 over the forefoot opening 210 of the shoe.

The construction of the shoe 10, as previously discussed, includes an interior surface 410 and a corrugated exterior surface 510. The upper 202 interior surface 410 and corrugated exterior surface 510 form a lattice-interlace surface 310. The interior surface 410 has a plurality of horizontal laths 412 and the corrugated exterior surface 510 has a plurality of vertical laths 512. For example, the plurality of horizontal laths 412 may be substantially parallel horizontal laths 412 and the plurality of vertical laths 512 may be a repeating series of furrows and ridges. It is contemplated that the plurality of horizontal laths 412 and the plurality of vertical laths 512 may be of uniform thickness and width; however, each may also have different thickness and/or width.

Figure 5:
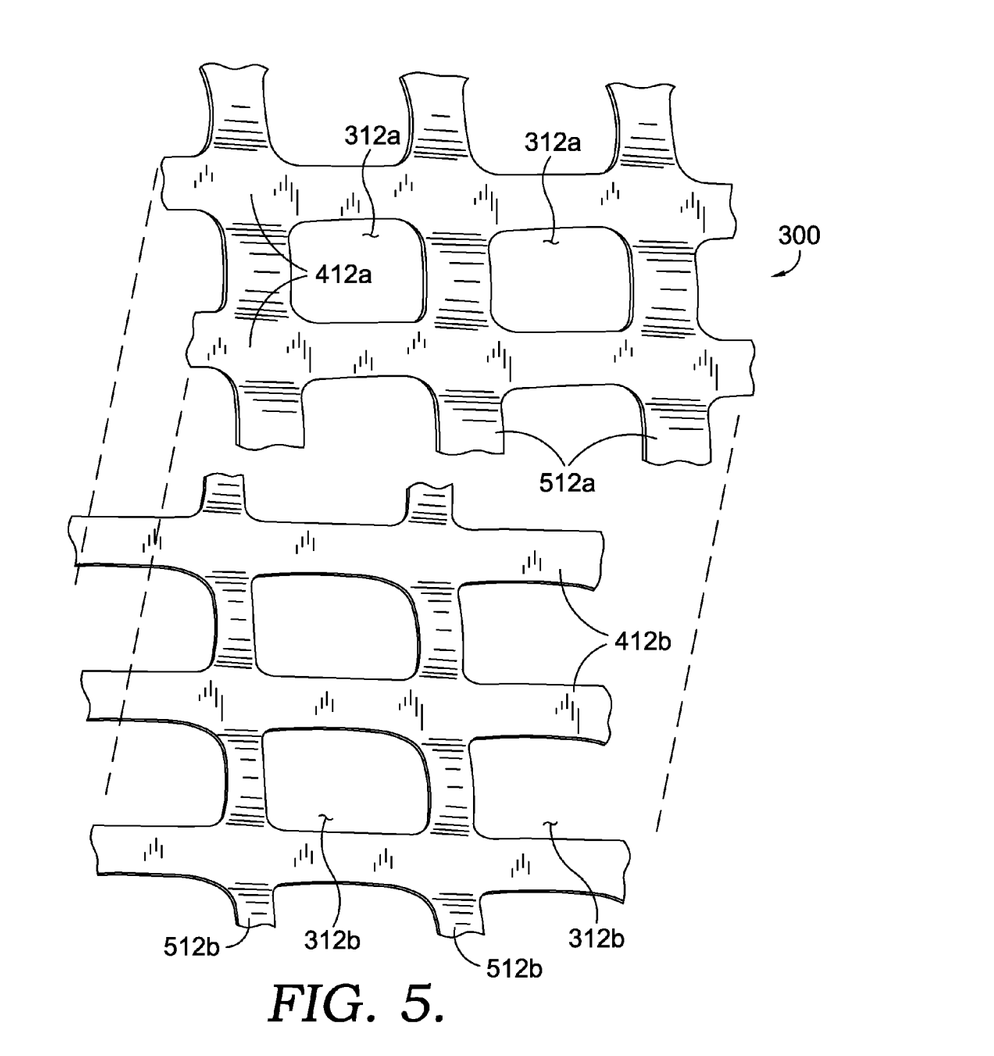
FIG. 5 depicts exemplary discrete portions of a lattice-interlace surface having a plurality of horizontal laths, a plurality of vertical laths, and a plurality of apertures, in accordance with an embodiment of the present invention.

The plurality of horizontal laths 412 and the plurality of vertical laths 512 form one or more lattices 300 each having lattice apertures (e.g., 312a and 312b), horizontal laths (e.g., 412a and 412b) and vertical laths (e.g., 512a and 512b), as best seen in FIG. 5. The lattice apertures 312 may be formed either by criss-crossing the plurality of horizontal laths 412 and the plurality of vertical laths 512 or interconnecting the plurality of horizontal laths 412 and the plurality of vertical laths 512 to form the lattice apertures 312 between the laths. It is contemplated that the width of the lattice apertures 312 may vary based on a position of the plurality of horizontal laths 412 and the plurality of vertical laths 512 in the lattices 300.

In an exemplary embodiment, the one or more lattices 300 are loosely interlaced to form the lattice-interlace surface 310. For example, traditional manufacturing methods limit the types of interlace surfaces that can be manufactured because methods like knitting and sewing cannot achieve certain geometric shapes and interconnections made possible through the integral construction of a shoe through the laser sintering process described above. From an exterior 14 perspective of the shoe, using sintered material, the plurality of horizontal laths 412a are interconnected with the plurality of vertical laths 512a within the plurality of apertures of 312b such that the plurality of horizontal laths 412a and 412b pass under the plurality of vertical laths 512a and 512b. In turn, the plurality of vertical laths 512a and 512b pass over the plurality of horizontal laths 412a and 412b. The interlacing of the plurality of horizontal laths 412a and 412b and the plurality of vertical laths 512a and 512b form the lattice-interlace surface 310.

Similarly, again from an exterior 14 of the shoe 10, the plurality of horizontal laths 412b are interconnected with the plurality of vertical laths 512b within the plurality of apertures of 312a such that the plurality of horizontal laths 412a and 412b pass under the plurality of vertical laths 512a and 512b. In turn the plurality of vertical laths 512a and 512b pass over the plurality of horizontal laths 412a and 412b. It is contemplated that the lattice-interlace is integrally formed as a single piece using sintered material. Nonetheless, for clarity purposes, we will discuss the lattice-interlace as though it only comprises a series of repeating discrete portions of horizontal laths 412 and vertical laths 512 forming a plurality of lattice apertures 312.

Figures 6, 7, 8:
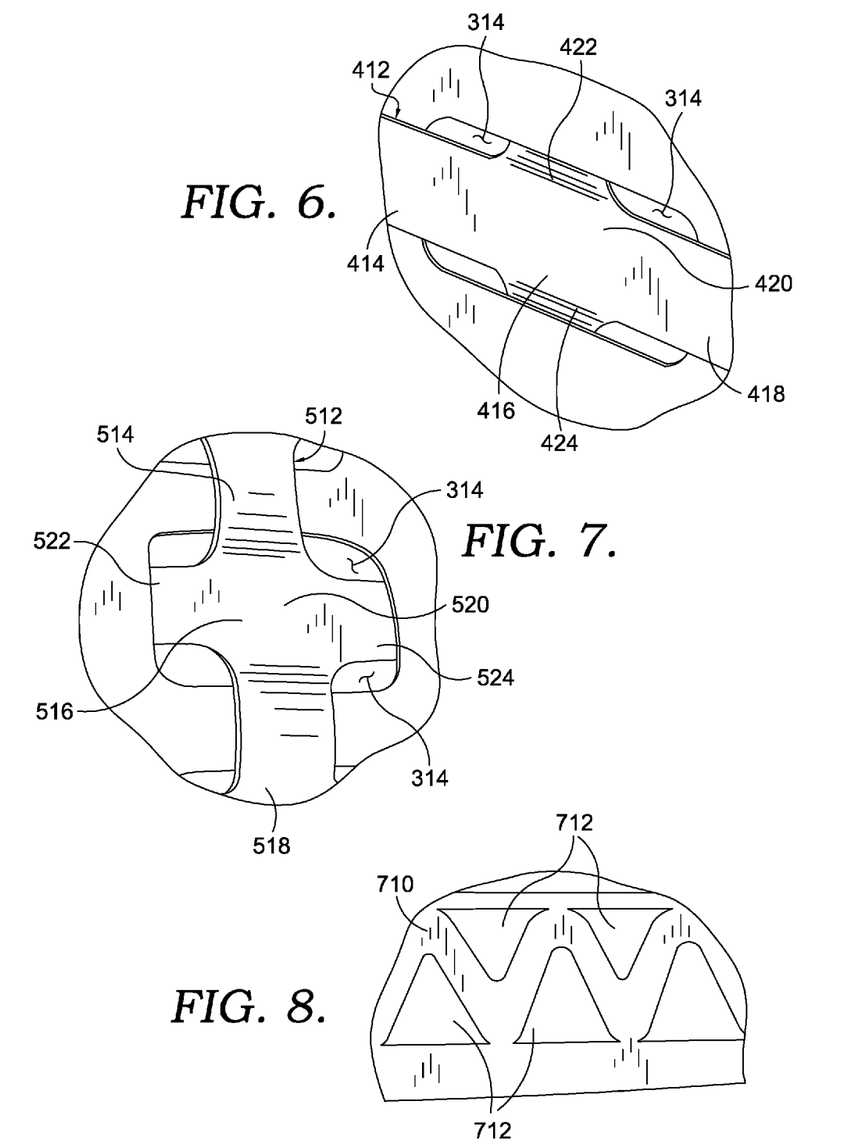
FIG. 6 depicts an exemplary discrete portion of an interior surface of a lattice-interlace surface of a shoe, in accordance with an embodiment of the present invention.
FIG. 7 depicts an exemplary discrete portion of a corrugated exterior surface of a lattice-interlace surface of a shoe, in accordance with an embodiment of the present invention.
FIG. 8 depicts an exemplary discrete portion of an exterior perforated sole portion having a plurality of perforations, in accordance with an embodiment of the present invention.

In embodiments, as previously discussed, the plurality of horizontal laths 412 and the plurality of vertical laths 512 may be interconnected with each other, as shown in FIG. 5. The horizontal laths 412 and vertical laths 512 are interconnected within the lattice apertures 312, as shown in FIG. 6 and FIG. 7. For example, the interconnected plurality of horizontal laths 412 and vertical laths 512 partition each of the lattice apertures 312 into a plurality of openings 314 in the interior surface 410 and the corrugated exterior surface 510. Interconnecting the plurality of horizontal laths 412 and the plurality of vertical laths 512 within the plurality of lattice apertures creates a plurality of openings 314 form the substantially loosely interlaced surface of the lattice-interlace surface 310.

In an exemplary embodiment, the interior surface 410 includes a horizontal lath 412 having a front region 414, a mid region 416, and a rear region 418. The horizontal lath 412 extends from the front region 414 along the mid region 416 to the rear region 418. The interior surface 410 further includes a reverse ridge 420 of the vertical lath 512 having a top furrow 422 and a furrow 424. The top furrow 422 is coupled to the bottom furrow 424 at the mid region 416 of the horizontal lath 412. The corrugated exterior surface 510 includes a vertical lath 512 having a top ridge 514, a furrow 516, and a bottom ridge 518. The top ridge 514 is coupled to the bottom ridge 518 at the furrow 516. The corrugated exterior 510 also includes a reverse region 520 of horizontal lath 412 having a front strip 522 and a rear strip 524. The reverse region 520 of the horizontal lath 412 extends from a front strip 522 along the furrow 516 of the vertical lath 512 to the rear strip 524. It is contemplated that the interior surface 410, the corrugated exterior surface 510, the plurality of lattice apertures 312, and the plurality of the openings 314 are integrally formed as a single piece using sintered material and described herein as discrete portions for clarity purposes.

Figure 3:
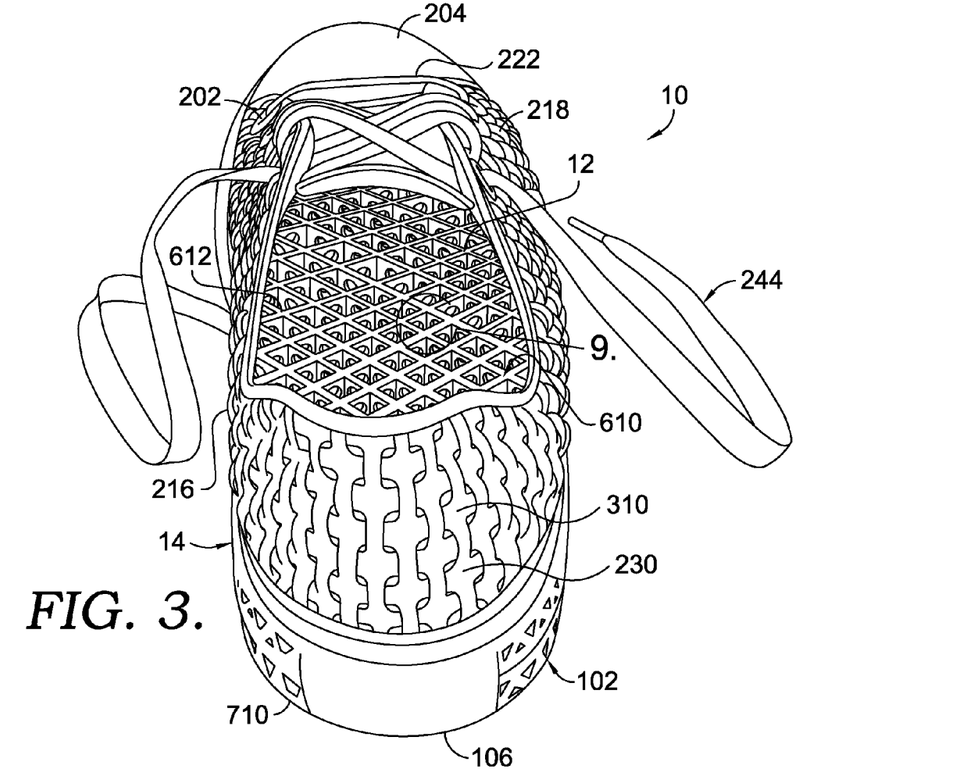
FIG. 3 depicts a heel end view of a shoe having an interior sole portion forming a tessellated framework in an interior of the shoe, in accordance with an embodiment of the present invention.

Turning to FIGS. 3-4, the interior sole portion 112 of sintered material extends from a heel end 106 to a toe end 104. The interior sole portion 112 forms a tessellated framework 610 that similarly extends from a heel end 106 to a toe end 104, where the tessellated framework 610 defines a plurality of voids 16, within the tessellated framework. For example, the tessellated framework 610 of the interior sole portion 112 forms three-dimensional blocks in the interior of the shoe that create a checkered pattern. It is contemplated that the tessellated framework 610 uses a repetition of multi-dimensional shapes with no gaps. The sintering process allows for aesthetically creative designs for the interior sole portion 112 while still having functional aspects of the shoe 10 incorporated therein. Further, the tessellated framework 610 creates an interior edge portion 114 around the interior 12 that extends in a perimeter analogous to a perimeter of the interior sole portion 112. For example, the interior edge portion 114 is adjacent to the sole 102 that is on the exterior 14 of the shoe 10.

Figure 9:
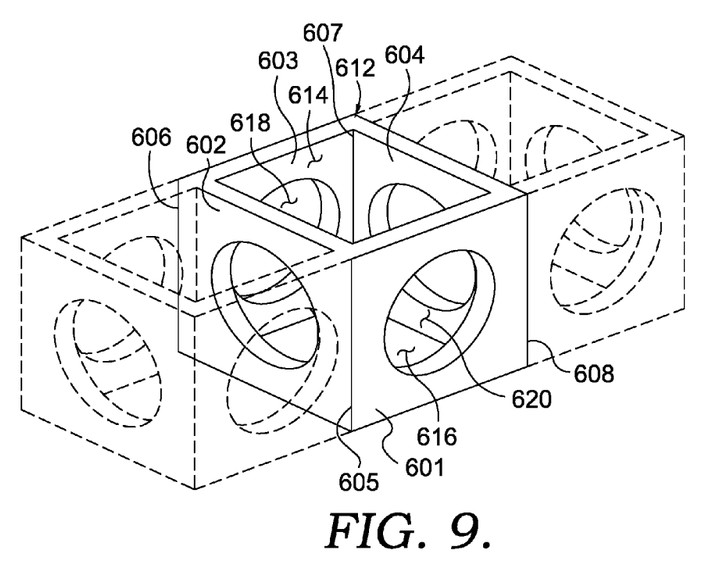
FIG. 9 depicts an exemplary discrete portion of a tessellated framework having a lattice of hollow cubes, in accordance with an embodiment of the present invention.

In an exemplary embodiment, the tessellated framework 610 includes a lattice of hollow cubes 612. Each hollow cube in the lattice of hollow cubes 612 may comprise four connected sides 601, 602, 603, and 604 at corners 605, 606, 607, and 608, and a top surface opening 614 and a bottom surface opening 616, as best seen in FIG. 9. The corners 605 and 607 may be oriented to face a medial side or an opposite lateral side of the shoe 10, respectively, while corners 606 and 608 may be oriented to face a toe end or an opposite heel end of the shoe 10, respectively, such that two of the four sides 601, 602, 603, and 604 are, in part, medial facing and the other two sides of the four sides 601, 602, 603, and 604 are, in part, lateral facing. The top surface opening 614 and bottom surface opening 616 may be rectilinear extending from an interior 12 of the shoe to an exterior 14 of the shoe. For example, water flowing into the shoe passes through the top surface opening 614 and flows out of the bottom surface opening 616. The four sides 601, 602, 603, and 604 of the hollow cube may also have substantially medial-facing apertures 618 or substantially lateral-facing apertures 620 depending on their respective orientations with respect to the shoe 10. The apertures 618 and 620 may provide additional courses for the water to flow into or out of the shoe. It should be understood that the plurality of openings 614 and 616 and the apertures 618 and 620 may be used to improve water flow both into and out of the shower shoe. For example, the top surface opening 614 may direct water flow out of the shoe 10 in one instance; however, the bottom surface opening 616 may direct water flow into the shoe in another instance. Similarly, the apertures 618 and 620 may provide additional water courses in either instance to improve water flow as required.

In an exemplary embodiment as shown in FIG. 8, an exterior perforated sole portion 710 includes a plurality of perforations 712. The perforations of the plurality of perforations are openings that extend from an exterior 14 of the shoe to an interior sole portion 112 of the shoe (e.g., tessellated framework 610 of the interior sole portion 112).

The perforations of the plurality of perforations 712 may be of a plurality of different shapes or different sizes, or substantially uniform or any combination thereof. For example, the plurality of perforations 712 may be a repeated series of interconnected chevron patterns. It is contemplated that the hollow cubes of the lattice of hollow cubes 612 located around the interior edge portion 114 are adjacent to a plurality of perforations 712 on the sole. For example, water flowing into the shoe through the lattice of hollow cubes 612 may flow out through any of the apertures 618 and 620 into the plurality of perforations 712 on the sole 102 of the shoe. As previously discussed, the present invention should be understood to also improve water flowing into the shoe 10. Therefore, the plurality of perforations 712 may also serve to improve water flow into the shoe 10. For example, the shoe may have sand that needs to be rinsed out of the shoe; the plurality of perforations 712 may function to provide water flow into the shoe 10 to rinse unwanted sand out of the shoe.

In an exemplary embodiment, the plurality of perforations 712 are arranged on a sole medial side 108 and extend forward from a position proximate to the heel end 106 to a position proximate to the toe end 104. Similarly, the plurality of perforations 712 are arranged on a sole lateral side 108 and extend forward from a position proximate to the heel end 106 to a position proximate to the toe end 104. It is contemplated that the exterior perforated sole portion 710 includes a top plurality of perforations 714, a sole ridge 716, and a bottom plurality of perforations 718. The top plurality of perforations 714 and the bottom plurality of perforations 718 are separated by the sole ridge 716 extending forwardly from a position proximate to the heel end 106 to a position proximate to the toe end 104.

It is contemplated that the shoe 10 may be constructed in the following manner, as best seen in FIG. 1, in accordance with embodiments of the present invention. The sole 102 has a toe end 104 and an opposite heel end 106. The sole also has a medial side 108 opposite to a lateral side 110. The sole 102 extends between the toe end 104 and the heel end 106. The shoe also includes an upper 202 that has an interior surface 410 and a corrugated exterior surface 510 of sintered material attached to the sole 102. The upper 202 extends upwardly from the sole 102 to an upper top edge on a medial side 206 and on a lateral side 208. The upper top edge defines a forefoot opening 210 and an ankle opening 232 into an interior of the shoe, the upper forming a lattice-interlace surface 310. The shoe further includes an interior sole portion 112 of sintered material that extends forwardly from a heel end 106 to a toe end 104 forming a tessellated framework 610. It is contemplated that the sole 102 further comprises an exterior perforated sole portion 710 that includes a plurality of perforations 712. It should be understood that the upper, the interior sole portion 112, and the exterior are integrally sintered as a single piece.

The terms medial and lateral have been used herein to describe a relative location of features, portions, and/or elements of the shoe 10. However, it is contemplated that aspects of the invention may substitute one relative term for the other. For example, it is within the scope of the present invention for the features identified on the medial side of the shoe 10 to also, or in the alternative, be located on the lateral side and vice versa.

Although the shoe construction is described above by referring to particular embodiments, it should be understood that the modifications and variations could be made to the shoe construction described without departing from the intended scope of protection provided by the following claims.

The invention claimed is:

1. A shoe construction comprising:
a sole having a toe end and an opposite heel end and having opposite medial and lateral sides extending between the toe end and the heel end, the sole including a tessellated framework, the tessellated framework comprising a lattice of hollow cubes, each hollow cube in the lattice of hollow cubes oriented with a first edge medially facing and a second edge laterally facing and having a top surface opening and a bottom surface opening extending from an interior of the shoe to an exterior of the shoe for allowing a fluid to flow through the shoe, wherein at least one hollow cube within the lattice of hollow cubes further comprises a first circular aperture that, at least in part, faces the medial side, and a second circular aperture that, at least in part, faces the lateral side, wherein the first circular aperture and the second circular aperture provide additional courses for an increased rate of fluid flow through the shoe; and
an upper forming a lattice-interlace with an interior surface and an exterior surface attached to the sole, the upper extending upwardly from the sole to an upper top edge, the upper top edge defining a forefoot opening and an ankle opening into an interior of the shoe.

2. The shoe construction of claim 1, wherein the interior surface comprising parallel horizontal laths longitudinally extending orthogonal to a plurality of vertical laths, wherein at least a portion of the plurality of vertical laths longitudinally extend perpendicular relative to a ground contacting surface of the sole.

3. The shoe construction of claim 1, wherein at least a portion of the exterior surface of the lattice-interlace comprises a plurality of vertical laths longitudinally extending orthogonal relative to a ground contacting surface of the sole.

4. The shoe construction of claim 1, wherein the lattice interlace comprises interconnected lattices having a plurality of horizontal laths and a plurality of vertical laths that form a plurality of openings when interconnected.

5. The shoe construction of claim 1, wherein at least a portion of the lattice-interlace comprises a plurality of vertical laths longitudinally extending perpendicular relative to a ground contacting surface of the sole on the exterior surface, and a plurality of horizontal laths longitudinally extending orthogonal to the plurality of vertical laths on the interior surface;
each horizontal lath in the plurality of horizontal laths on the interior surface having a front region, a mid region, and a rear region, the each horizontal lath extending from a first region along the mid region to the rear region;
a each vertical lath in the plurality of vertical laths on the exterior surface having one or more ridges and furrows;
wherein the plurality of horizontal laths and the vertical laths form a plurality of openings when interconnected, wherein the plurality of openings are a partition of lattice apertures.

6. The shoe construction of claim 1, wherein the upper is integrally sintered as a single piece.

7. A shoe construction comprising:
a sole having a toe end and an opposite heel end and having opposite medial and lateral sides extending between the toe end and the heel end;
an upper attached to the sole, the upper extending upwardly from the sole to an upper top edge, the upper top edge defining a forefoot opening and an ankle opening into an interior of the shoe, the upper forming a lattice-interlace the exterior surface having a plurality of vertical laths longitudinally extending perpendicular relative to a ground-contacting surface of the sole at least at a first portion of the upper, and the interior surface having a plurality of horizontal laths longitudinally extending orthogonal to the plurality of vertical laths, wherein the plurality of horizontal laths and plurality of vertical laths form a plurality of lattice apertures extending from the interior of the shoe construction to an exterior of the shoe construction, wherein each of the plurality of lattice apertures are partitioned into a plurality of openings when the plurality of vertical laths and the plurality of horizontal laths are interconnected; and
an interior sole portion extending forwardly from the heel end to the toe end forming a tessellated framework, the tessellated framework comprising a lattice of hollow cubes, at least one hollow cube in the lattice of hollow cubes oriented with a first edge medially facing and a second edge laterally facing and having a top surface opening and a bottom surface opening extending from an interior of the shoe to an exterior of the shoe allowing a fluid to flow through the shoe, wherein each hollow cube within the lattice of hollow cubes further comprises a first circular aperture that, at least in part, faces the medial side, and a second circular aperture that, at least in part, faces the lateral side, wherein the first circular aperture and the second circular aperture provide additional courses for an increased rate of fluid flow through the shoe.

8. The shoe construction of claim 7, wherein the sole further comprises an exterior perforated sole portion including a plurality of perforations.

9. The shoe construction of claim 8, wherein the plurality of perforations comprise a plurality of different shapes and plurality of different sizes.

10. The shoe construction of claim 8, wherein the plurality of perforations includes a repeated series of interconnected chevron patterns.

11. The shoe construction of claim 8, wherein the lattice of hollow cubes on an interior edge region of the interior sole portion are adjacent to the plurality of perforations.

12. The shoe construction of claim 8 further comprising:
the plurality of perforations arranged on the medial side extending forwardly from a position proximate to the heel end to a position proximate to the toe end; and
the plurality of perforations arranged on the lateral side extending forwardly from a position proximate to the heel end to a position proximate to the toe end.

13. The shoe construction of claim 12, wherein the sole further comprises a top plurality of perforations and a bottom plurality of perforations separated by a sole ridge extending forwardly from a position proximate to the heel end to a position proximate to the toe end.

14. The shoe construction of claim 8, wherein the interior sole portion and the exterior perforated sole portion are integrally manufactured by a rapid manufacturing technique as a single piece.

15. A shoe construction comprising:
a sole having a toe end and an opposite heel end and having a medial side and a lateral side extending between the toe end and the heel end, the sole including a tessellated framework, the tessellated framework comprising a lattice of hollow cubes, each hollow cube in the lattice of hollow cubes oriented with a first edge medially facing and a second edge laterally facing and having a top surface opening and a bottom surface opening extending from an interior of the shoe to an exterior of the shoe, wherein at least one hollow cube in the plurality of hollow cubes further comprises a first circular aperture that, at least in part, faces one of the medial side or the lateral side; and an upper having an interior surface and an exterior surface attached to the sole, the upper extending upwardly from the sole to an upper top edge, the upper top edge defining a forefoot opening and an ankle opening into an interior of the shoe, the upper forming a lattice-interlace, the exterior surface of the upper having a plurality of vertical laths longitudinally extending perpendicular relative to a ground contacting surface of at least a portion of the sole, the interior surface of the upper having a plurality of horizontal laths longitudinally extending orthogonal to the plurality of vertical laths; and further wherein a plurality of openings extending from an interior of the shoe construction to an exterior of the shoe construction are formed when the plurality of vertical laths and the plurality of horizontal laths are interconnected.

16. The shoe construction of claim 15, further comprising a second circular aperture that, at least in part, faces the first circular aperture to
provide additional courses for an increased rate of fluid flow through the shoe.

17. The shoe construction of claim 16, wherein the sole further comprises an exterior perforated sole portion including a plurality of perforations.

18. The shoe construction of claim 17, wherein the upper, the interior sole portion, and the exterior are integrally manufactured by a rapid manufacturing technique as a single piece.

* * * * *

UNITED STATES PATENT AND TRADEMARK OFFICE
CERTIFICATE OF CORRECTION

PATENT NO. : 9,756,894 B2  Page 1 of 1
APPLICATION NO. : 13/657125
DATED : September 12, 2017
INVENTOR(S) : Sean M. McDowell and Bryan Paul Cioffi It is certified that error appears in the above-identified patent and that said Letters Patent is hereby corrected as shown below:

On the Title Page

Please add and update item (72) Inventors as follows:
Sean M. McDowell, Bryan Paul Cioffi and Stephen N. Bruno Signed and Sealed this
Twenty-second Day of September, 2020

Andrei Iancu
*Director of the United States Patent and Trademark Office*